US006869556B2

(12) United States Patent
Ho et al.

(10) Patent No.: US 6,869,556 B2
(45) Date of Patent: Mar. 22, 2005

(54) MOLDING SYSTEM FOR SEMICONDUCTOR PACKAGES

(75) Inventors: Shu Chuen Ho, Singapore (SG); Teng Hock Kuah, Singapore (SG); Jian Wu, Singapore (SG); Si Liang Lu, Singapore (SG)

(73) Assignee: ASM Technology Singapore Pte Ltd. (SG)

( * ) Notice: Subject to any disclaimer, the term of this patent is extended or adjusted under 35 U.S.C. 154(b) by 342 days.

(21) Appl. No.: 10/197,312

(22) Filed: Jul. 16, 2002

(65) Prior Publication Data

US 2004/0012119 A1 Jan. 22, 2004

(51) Int. Cl.[7] .......................... B29C 45/14; B29C 45/64; B29C 70/72; H01L 21/56
(52) U.S. Cl. .................. 264/272.17; 425/116; 425/125; 425/129.1; 425/190; 425/192 R; 425/171; 425/215; 425/595
(58) Field of Search ................................. 425/116, 125, 425/129.1, 192 R, 190, 215, 171, 595; 264/272.17

(56) References Cited

U.S. PATENT DOCUMENTS

| | | | | |
|---|---|---|---|---|
| 3,898,030 A | * | 8/1975 | Bishop | ........................ 425/190 |
| 5,030,406 A | * | 7/1991 | Sorensen | .................. 425/129.1 |
| 5,049,343 A | * | 9/1991 | Sorensen | .................. 425/129.1 |
| 5,104,308 A | * | 4/1992 | Morton et al. | ............... 425/595 |

FOREIGN PATENT DOCUMENTS

| | | | | |
|---|---|---|---|---|
| JP | 08025424 A | * | 1/1996 | ........... B29C/45/27 |
| WO | 9850216 | | 11/1998 | |
| WO | WO 01/98049 A1 | * | 12/2001 | ........... B29C/33/30 |

* cited by examiner

Primary Examiner—Robert B. Davis
(74) Attorney, Agent, or Firm—Ostrolenk, Faber, Gerb & Soffen, LLP

(57) ABSTRACT

The present invention provides a molding system as well as a method for encapsulating semiconductor packages, wherein a cavity plate is kept at a desired temperature during molding. The system includes a mold comprising a first mold piece and a second mold piece adapted to define a mold cavity for enclosing one or more semiconductor devices for molding, and a cavity plate adapted for mounting in the cavity to introduce encapsulation material to the semiconductor device(s). The system also includes retaining means adapted selectively to hold the cavity plate against the first mold piece or the second mold piece whereby to maintain the cavity plate at the desired temperature.

19 Claims, 5 Drawing Sheets

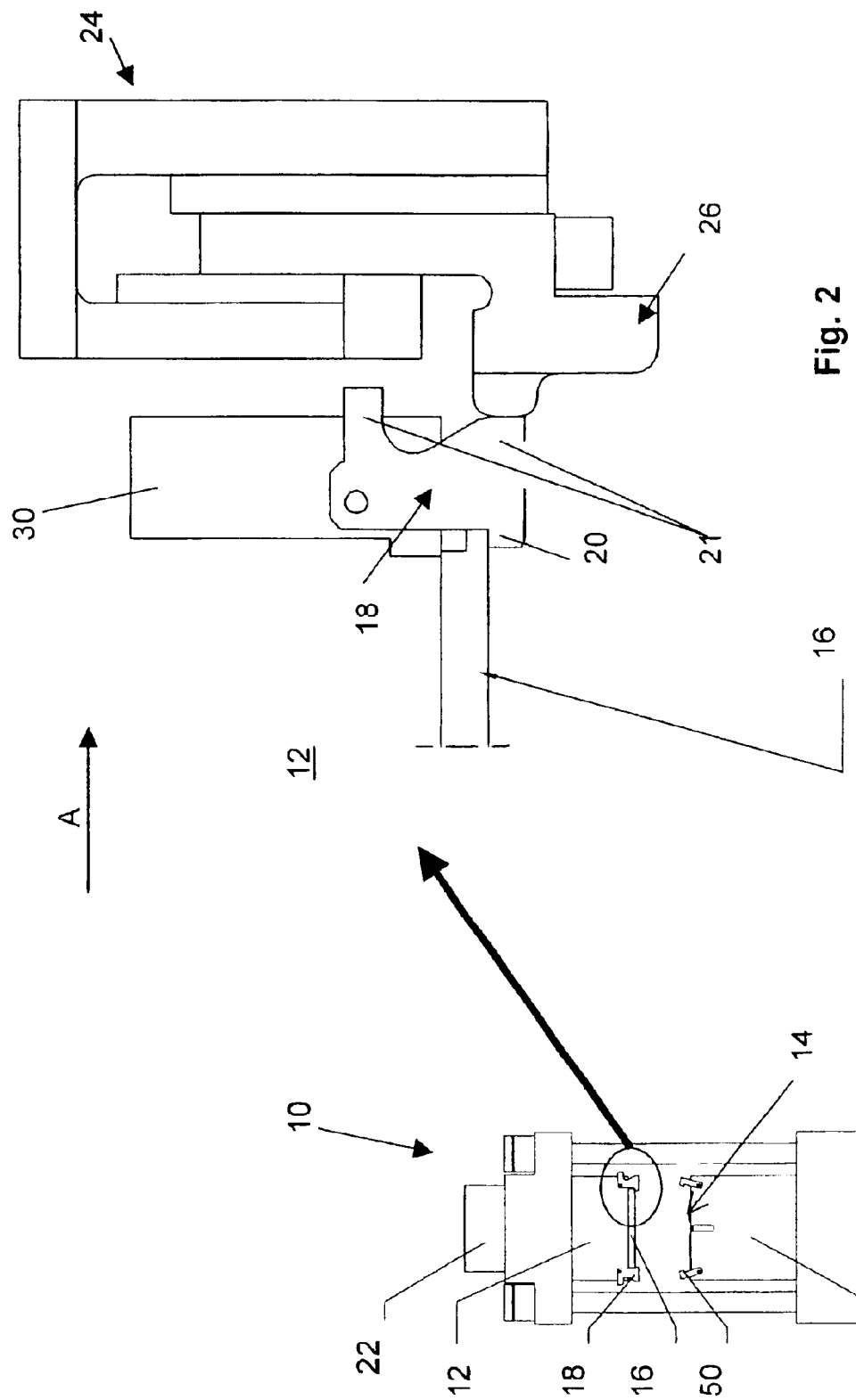

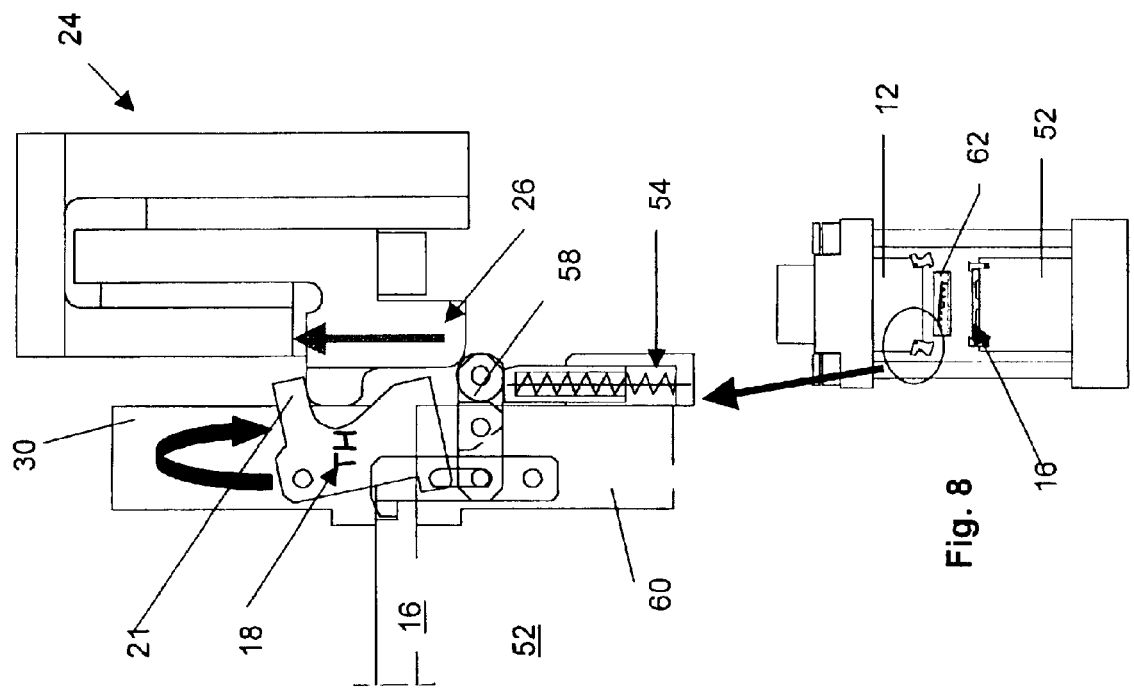

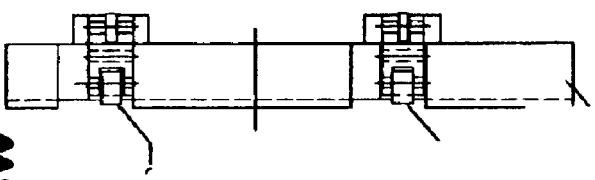
Fig. 9
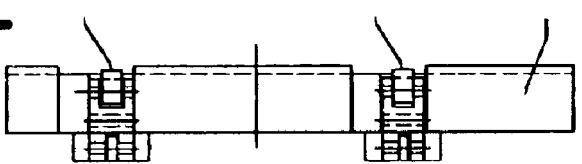
Fig. 10
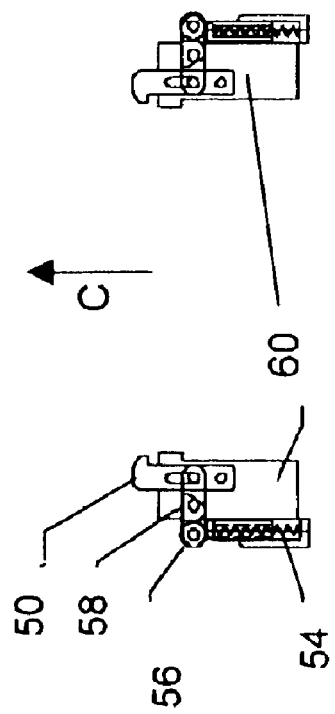

MOLDING SYSTEM FOR SEMICONDUCTOR PACKAGES

FIELD OF THE INVENTION

The present invention relates to a system for the transfer-molding of semiconductor packages, such as Ball-Grid Array ("BGA") or leadframe packages.

BACKGROUND AND PRIOR ART

Currently, semiconductor packages are commonly molded with resin in a process referred to as transfer-molding. Resin tablets are heated, melted and compressed, and molten resin is distributed to a plurality of semiconductor devices via a network of runners and gates. The molten resin is then forced into mold cavities where the dies have been placed. Resin is introduced into the cavities of molds through these gates. Traditionally, resin is introduced into the cavities through gates formed in mold halves that are lateral to the surface of the semiconductor device, commonly referred to as a side gate system. However, this has been found to be undesirable because of problems such as wire sweep, that may occur for semiconductor devices having smaller sizes and/or higher pin counts.

Thus, a "direct gating" or "top gating" approach is now gaining popularity, wherein resin is introduced into cavities from gates on top of the semiconductor devices. Amongst other advantages, this approach has been found to avoid the aforesaid problem of wire sweep. An example of its implementation is found in PCT publication number WO 98/50216 entitled "Method and Apparatus for Molding Plastic Packages". Direct gating generally introduces the use of a removable cavity plate (hereinafter referred to as a "middle plate") sandwiched between top and bottom halves of a mold to channel and direct resin into the cavities from the top of the cavity. This introduces a new problem of how to efficiently manipulate this extra middle plate.

Since resin travels through the middle plate, it needs to be sufficiently hot to facilitate the flow of molten resin. Otherwise, the resin will harden and set undesirably before the molding process is completed. One solution in the prior art is to pre-heat the middle plate between each molding process by using an external heating apparatus. However, this necessitates transporting the middle plate outside the molding machine to heat up the middle plate, and later to transport it back to the molding press. This requires extra mechanisms to handle the pre-heating process. In addition, a separate de-gating station is required to remove the cull from the molded packages after the molding process is completed.

SUMMARY OF THE INVENTION

It is an object of the invention to seek to provide an improved apparatus for performing transfer-molding of semiconductor packages.

According to a first aspect of the invention there is provided a molding system for encapsulating semiconductor packages, including:
   a mold comprising a first mold piece and a second mold piece adapted to define a mold cavity for enclosing one or more semiconductor devices for molding;
   a cavity plate adapted for mounting in the cavity to introduce encapsulation material to the semiconductor device(s); and
   retaining means adapted selectively to hold the cavity plate against the first mold piece or the second mold piece whereby to maintain the cavity plate at a desired temperature during molding.

According to a second aspect of the invention there is provided a method for encapsulating semiconductor packages, comprising:
   placing one or more semiconductor devices into a mold having a mold cavity defined by a first mold piece and a second mold piece, and a cavity plate located between the mold pieces, the cavity plate initially being held against the first mold piece;
   closing the mold in order to sandwich the semiconductor device(s) between the first mold piece, second mold piece and the cavity plate;
   molding the semiconductor device(s) by introducing encapsulation material to the semiconductor device(s) via the cavity plate; and
   selectively holding the cavity plate against the first mold piece or second mold piece whereby to maintain the cavity plate at a desired temperature during molding.

Using the invention it is possible to maintain a cavity or middle plate at a desired, molding, temperature more efficiently and reliably during molding.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

FIG. 1 is a side view of a molding machine embodying an apparatus according to a preferred embodiment of the invention.

FIG. 2 is an enlarged view of a top holder portion of the apparatus of FIG. 1.

FIG. 7 is a side view showing the movement of the holder mount and cam mechanisms prior to the separation of the mold halves.

FIG. 8 is a side view of the molding machine of FIG. 1 wherein the mold halves have separated and a cull bin is introduced to collect cull created by the molding process.

FIG. 9 shows the top view of the bottom mold house.

FIG. 10 is a side view of the bottom holders looking from direction C of FIG. 9.

DETAILED DESCRIPTION OF PREFERRED EMBODIMENT OF THE INVENTION

Figure 4:
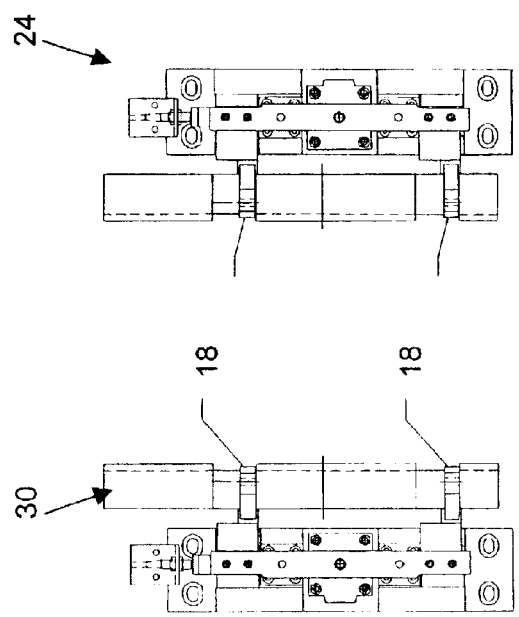
FIG. 4 is a top view of a holder mount looking from direction B of FIG. 3.

FIG. 1 is a side view of a molding machine 10 embodying an apparatus according to a preferred embodiment of the invention. The molding machine 10 comprises a first mold piece, which may be a top mold 12, and a second mold piece, which may be a bottom mold 52, that are heated to a suitable molding temperature. A cavity plate or middle plate 16 is positioned between the top mold 12 and bottom mold 52, and it houses a gate, cull and runner system for direct gate molding. The middle plate 16 is in complete contact with the top mold 12 or bottom mold 52 to ensure that it is kept at the molding temperature. One or more semiconductor devices 14 are placed into the mold on top of the bottom mold 52.

The molding machine 10 further comprises retaining means to hold the middle plate 16 against the top mold 12 or bottom mold 52 to maintain the middle plate at the molding temperature. The retaining means may comprise holding devices, illustrated herein as a top holder 18 and a bottom holder 50, which function to hold the middle plate 16 adjacent to the top mold 12 or bottom mold 52 as appropriate. A top cylinder 22 controls mechanisms to actuate the activation and deactivation of the top holder 18 and bottom holder 50, as will be explained in further detail below.

FIG. 2 is an enlarged view of the top holder portion of the apparatus of FIG. 1. It illustrates the top holder 18, which functions as a cam device. It comprises generally of a locking surface 20 and abutment surfaces 21. In the position shown, the locking surface 20 locks and retains the middle plate 16 adjacent to, and in complete contact with, the top mold 12. Disposed adjacent to the top holder 18 is a holder mount 24 with an actuator 26. The holder mount 24 is movable in a vertical axis and its movement is controlled by the top cylinder 22. As is apparent from FIG. 2, as the holder mount 24 is raised, the actuator 26 abuts the abutment surfaces 21 to rotate the top holder 18 and unlock the middle plate 16.

Figure 3:
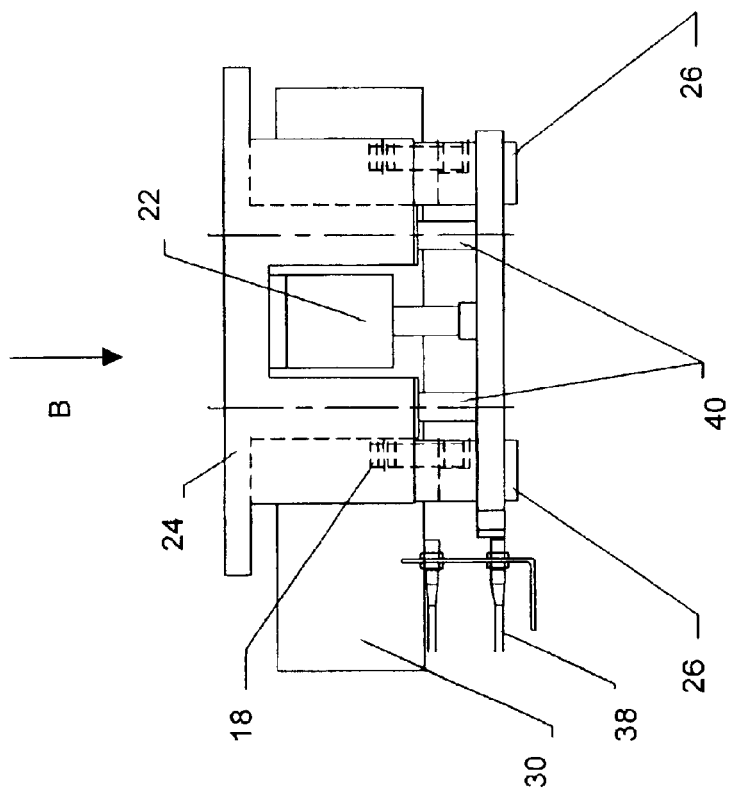
FIG. 3 is a side view of a holder mount looking from direction A of FIG. 2.

FIG. 3 is a side view of a holder mount 24 looking from direction A of FIG. 2. It shows the major components of the apparatus controlling the top holder 18. The top cylinder 22 raises and lowers the holder mount 24, preferably using hydraulic or pneumatic means, and is connected to the holder mount 24 using guide rods 40. The position of the actuator 26 is determined by a pair of positioning sensors 38 strategically placed proximate to the preferred positions of the actuator 26 in the raised and lowered positions. The top holder 18 is attached to a top mold house 30 which houses the top mold 12.

FIG. 4 is a top view of a holder mount 24 looking from direction B of FIG. 3. A pair of holder mounts 24 are positioned on the outside of a pair of top mold houses 30 used for housing the top mold (12, not shown in FIG. 4). The top holders 18 are attached to the top mold houses 30.

At this point, a molding cycle commences. An on-loader (not shown) will move into the space between the top and bottom molds 12, 52 to load pellets and/or leadframes onto the bottom mold 52 for molding. On the onset of molding, the mold press closes as a result of the bottom mold 52 moving towards the stationary top mold 12, where the middle plate 16 is attached. Once the mold press is fully closed, the transfer molding can begin.

Figure 5:
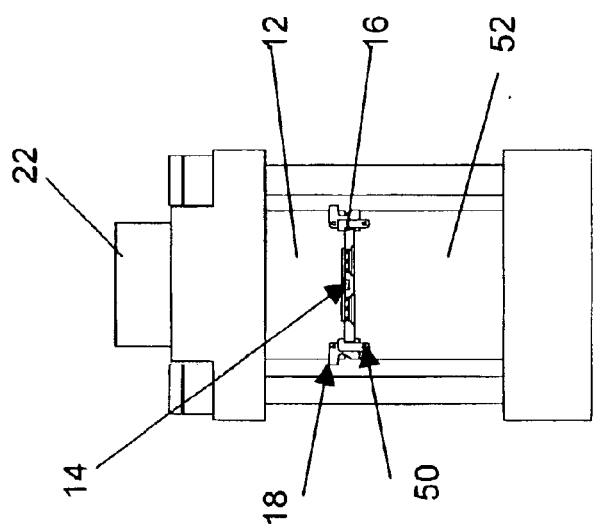
FIG. 5 is a side view of the molding machine of FIG. 1 wherein the mold halves have been closed for molding.

FIG. 5 is a side view of the molding machine 10 of FIG. 1 wherein the top and bottom molds 12, 52 have been closed for molding. The middle plate 16 is sandwiched between the top and bottom molds 12, 52. FIG. 5 also gives a cross-sectional side view of the gate and runner system of the middle plate 16.

Figure 6:
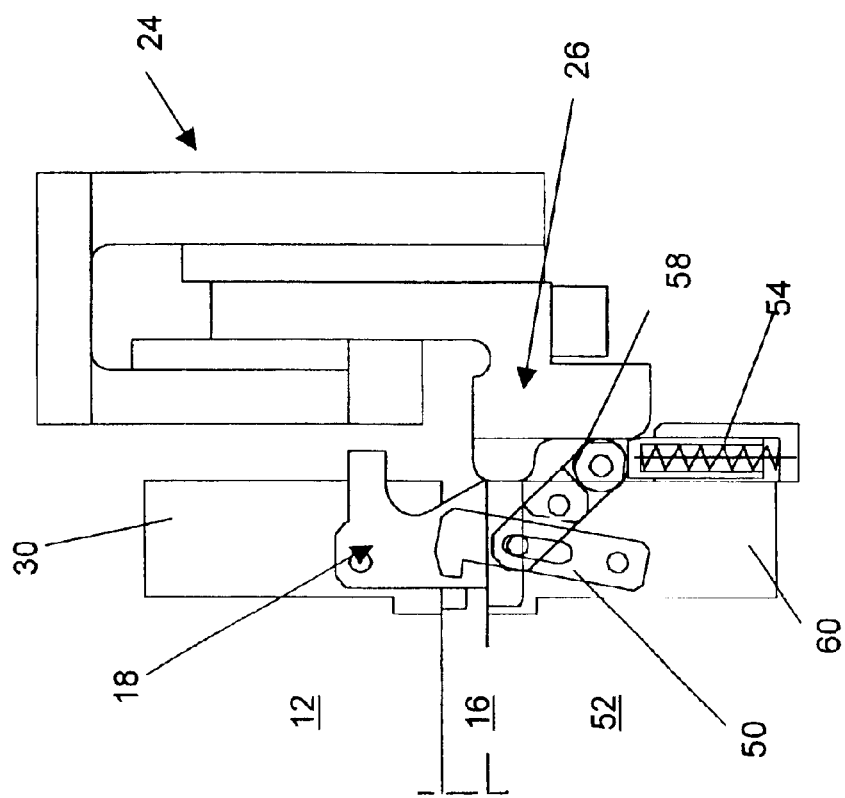
FIG. 6 is an enlarged view of the combination of top and bottom holders of FIG. 5.

FIG. 6 is an enlarged view of the combination of top and bottom holders 18, 50 of FIG. 5. The middle plate 16 is locked by the top holder 18 to the top mold 12, although at this time, the middle plate 16 is also in contact with the bottom mold 52. The molding process can be commenced at this point.

Also illustrated in FIG. 6 is the bottom mold house 60 housing the bottom mold 52. A bottom holder 50, such as a locking holder, is attached to the bottom mold house 60. The bottom holder 50 pivots about a pivot point relative to the bottom mold house 60. A self-lock bar 58 connects the bottom holder 50 to a resilient means, such as a return spring 54. It is apparent from FIG. 6 that the actuator 26 is capable of applying pressure on the return spring 54. As the return spring 54 is pressed downwards, the bottom holder 50 is disengaged from locking with the middle plate 16. As the return spring 54 is released, the linkage of the return spring 54 and self-locking bar 58 biases the bottom holder 50 into locking position with the middle plate 16.

FIG. 7 is a side view showing the movement of the holder mount 24 and cam mechanisms prior to the separation of the mold halves 12, 52. The holder mount 24 is raised by movement of the top cylinder 22, which not only releases the return spring 54 but abuts and pushes against the abutment surface 21 of the top holder 18. As a result, the bottom holder 50 is pivotally moved into locking engagement with the middle plate 16, whereas the locking surface 20 of the top holder 18 is moved away from its locking position with the middle plate 16. The middle plate 16 will now be locked to the bottom mold 52 and bottom mold house 60, when the bottom mold 52 is lowered away from the top mold 12.

FIG. 8 is a side view of the molding machine of FIG. 1 wherein the mold halves 12, 52 have separated and a cull bin 62 is introduced to collect cull formed by the molding process. It would be noted that the middle plate 16 is now locked to the bottom mold 52. Cull, which had developed between the top mold and the middle plate 16, adheres to the bottom surface of the top mold 12. The cull bin 62 may be brought into the press with an off-loader (not shown). The cull bin 62 can also optionally be introduced together with a cleaning apparatus so that cleaning of the mold surfaces and collecting the cull may be executed relatively simultaneously. In order to separate the cull from the bottom surface of the top mold 12, ejection means such as ejector pins or means to provide an injection of pressurized air such as air jets may be used to eject the cull. The cull bin 62 is then removed from the molding machine 10. The molded parts are now located between the middle plate 16 and the bottom mold 52.

FIG. 9 shows the top view of the bottom mold house 60 and the relative positions of the bottom holders 50, which are attached to the bottom mold house 60.

FIG. 10 is a side view of the bottom holders 50 looking from direction C of FIG. 9. The bottom holders 50 are attached to the bottom mold house 60 which house the bottom mold 52. In the position shown, the return spring 54 has been released and moves the proximal end of the self-lock bar 58 upwards. A bearing 56 may be introduced to facilitate relative movement of the self-lock bar 58 and the return spring 54. The self-lock bar 58 is biased into a perpendicular position relative to the return spring 54, and that in turn biases the bottom holder 50 into a perpendicular position relative to the self-lock bar 58. The result is that the bottom holder 50 engages the top surface of the middle plate 16 and locks it to the bottom mold 52.

Once the de-culling action is completed, the bottom mold 52 will again move up towards the top mold 12 to close the mold press. Once the mold press is closed, the holder mount 24 is lowered so that the top holder 18 and bottom holder 50 will be activated to lock the middle plate 16 to the top mold 12, and unlock the middle plate 16 from the bottom mold 52. The mold is opened while the middle plate 16 is held against the top mold 12. The semiconductor packages 14 may thus be removed from the bottom mold 52. The molding cycle may then be repeated beginning from FIG. 1.

It will be understood that the invention makes use of the opening and closing movements of the mold press to transfer the middle plate 16 housing the gate, cull and runner system between contact with the top mold 12 and the bottom mold 52. This transfer ensures that the cavity plate 16 is kept heated at a desired, molding, temperature during molding. Furthermore, using this process of encapsulation, there is no need for a special de-gating station separate from the molding machine 10, which is a further improvement over the prior art.

The invention described herein is susceptible to variations, modifications and/or additions other than those specifically described and it is to be understood that the invention includes all such variations, modifications and/or additions which fall within the spirit and scope of the above description.

What is claimed is:

1. Molding system for encapsulating semiconductor packages, including:
    a mold comprising a first mold piece and a second mold piece adapted to define a mold cavity for enclosing one or more semiconductor devices for molding;
    a cavity plate adapted for mounting in the cavity to introduce encapsulation material to the semiconductor device(s); and
    retaining means adapted selectively to hold the cavity plate against the first mold piece or the second mold piece whereby to maintain the cavity plate at a desired temperature during molding.

2. Molding system according to claim 1, wherein the retaining means is adapted to maintain the cavity plate in surface contact with either the first mold piece or the second mold piece during molding.

3. Molding system according to claim 1, wherein the retaining means comprises one or more holding devices mounted adjacent to the mold pieces.

4. Molding system according to claim 3, including an actuator adapted to activate or deactivate a holding device in order to respectively lock or unlock the cavity plate against the first and/or second mold piece.

5. Molding system according to claim 4, including hydraulic or pneumatic means connected to the actuator to position the actuator relative to a holding device, the actuator having a first position wherein the holding device is activated and a second position wherein the holding device is deactivated.

6. Molding system according to claim 5, including a second holding device that is deactivated by the actuator when the holding device is activated, and wherein the second holding device is deactivated by the actuator when the holding device is activated.

7. Molding system according to claim 5, including position sensors proximate to the first position and the second position respectively to ascertain the position of the actuator.

8. Molding system according to claim 3, wherein the holding device comprises a cam pivotally arranged adjacent to a mold piece and having abutment surfaces capable of receiving an actuating force to rotate the cam and a locking surface adapted to lock the cavity plate against a respective mold piece, whereby rotation of the cam in one direction locks the cavity plate against the respective mold piece and rotation of the cam in an opposite direction unlocks the same.

9. Molding system according to claim 3, wherein the holding device comprises a locking holder pivotally arranged adjacent to a mold piece and resilient means connected to the locking holder capable of displacing the locking holder between a locking position to an unlocking position with the cavity plate.

10. Molding system according to claim 9, wherein the locking holder is displaceable by compression and/or extension of the resilient means.

11. Molding system according to claim 10, including a self-lock bar intermediate between the locking holder and the resilient means to bias the locking holder towards the locking position or the unlocking position.

12. Molding system according to claim 1, including ejection means associated with a mold piece to eject cull from a surface of the mold piece.

13. Molding system according to claim 12, wherein the ejection means is an ejector pin or means for providing injection of compressed air.

14. Method for encapsulating semiconductor packages, comprising:
    placing one or more semiconductor devices into a mold having a mold cavity defined by a first mold piece and a second mold piece, and a cavity plate located between the mold pieces, the cavity plate initially being held against the first mold piece;
    closing the mold in order to sandwich the semiconductor device(s) between the first mold piece, second mold piece and the cavity plate;
    molding the semiconductor device(s) by introducing encapsulation material to the semiconductor device(s) via the cavity plate; and
    selectively holding the cavity plate against the first mold piece or second mold piece whereby to maintain the cavity plate at a desired temperature during molding.

15. Method according to claim 14, including maintaining the cavity plate in surface contact with either the first mold piece or the second mold piece at each stage of a molding process.

16. Method according to claim 14, comprising holding the cavity plate against the second mold piece while opening the mold to remove cull.

17. Method according to claim 16, wherein the step of removing cull includes:
    introducing a cull bin into the open mold;
    ejecting cull from a surface of a mold piece into the cull bin; and
    removing the cull bin containing cull from the mold.

18. Method according to claim 17, wherein ejector pins or an injection of compressed air is used to eject cull from the surface of the mold piece.

19. Method according to claim 14, further comprising:
    closing the mold;
    holding the cavity plate against the first mold piece while opening the mold; and
    removing the semiconductor packages from the mold.

* * * * *